Aug. 17, 1965
F. J. CHANTILES ETAL
3,200,732
CONTROL MEANS FOR VEHICLE HEATING SYSTEM
Filed Dec. 8, 1961
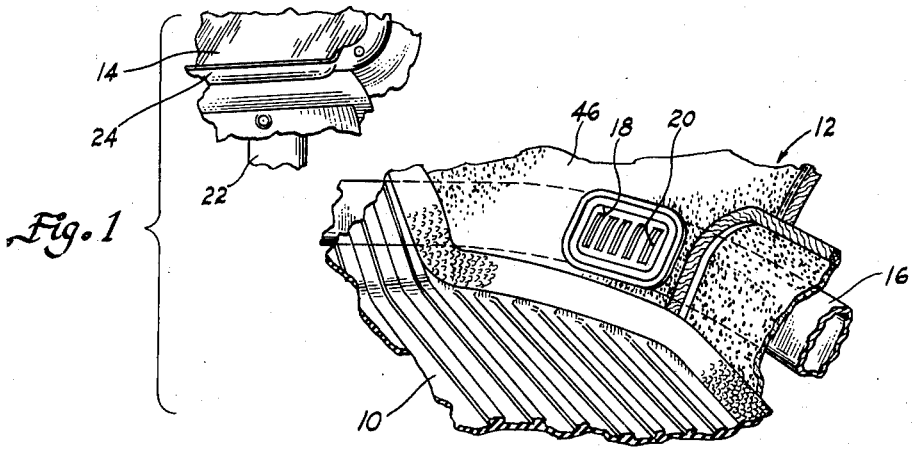
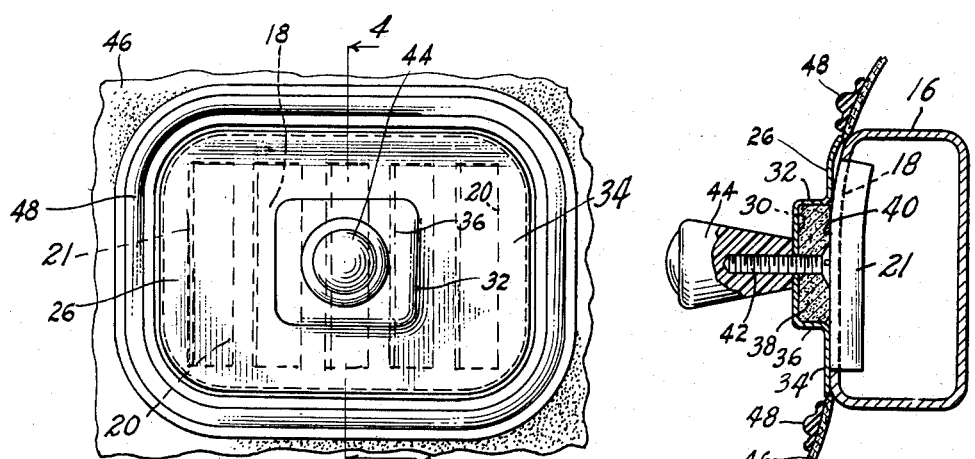
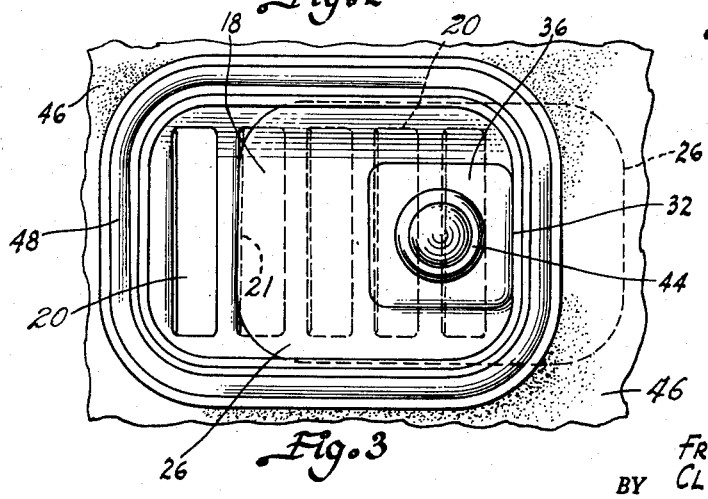
INVENTORS
FRED J. CHANTILES
BY CLAIR W. REIBER
ATTORNEY

United States Patent Office 3,200,732
Patented Aug. 17, 1965

3,200,732
CONTROL MEANS FOR VEHICLE
HEATING SYSTEM
Fred J. Chantiles, 35 E. 8th Ave., York, Pa., and Clair
W. Reiber, York, Pa.; said Reiber assignor to said
Chantiles
Filed Dec. 8, 1961, Ser. No. 157,929
3 Claims. (Cl. 98—2)

This invention relates to control means for a vehicle heating system and, more particularly, to a vehicle heating system arranged to heat the interior of the vehicle and also direct heated air against the inner surface of the windshield, to defrost the same, from a common conduit having spaced outlet means therein respectively for performing said several heating functions.

In certain motor vehicles, a plurality of heating conduits extend along opposite sides of the vehicle between the interior and exterior walls of the body thereof and adjacent the floor of the vehicle, one end of each of said conduits extending upwardly adjacent the fire wall of the vehicle so as to discharge adjacent the lower outside corner of the windshield adjacent opposite sides of the vehicle so as to defrost the windshield. Adjacent the floor of the vehicle, each of said heating conduits are provided with outlet means covered by grill means for purposes of permitting the discharge of heated air into the interior of the vehicle body adjacent the floor thereof. A single control means is provided to regulate the discharge of heated air through said conduits but no means are provided to discharge heated air selectively either through the outlet means adjacent the floor or the windshield defrosting discharge means if, for example, conditions require the use of a greater amount of heated air than normal for defrosting the windshield, for example.

Due to the provision of only a single discharge control means for the heating conduits referred to above, whereby when the control means is open to permit the discharge of heated air through the conduit means into the vehicle, such discharge takes place simultaneously, at all times, through the lower discharge means adjacent the floor and the upper, windshield defrosting discharge means. Under normal driving conditions, such simultaneous discharge of heated air through both of said discharge means in each of the conduits is satisfactory because all of the air is used to heat the interior of the body of the vehicle. However, in extremely cold weather accompanied by icing conditions, the amount of air discharging through the windshield defrosting outlets is not adequate to keep the windshield free from ice, notwithstanding the fact that the heated air normally discharging from the outlets adjacent the floor could be dispensed with without undue hardship to the occupants, especially for purposes of providing a windshield through which vision is not obstructed by ice.

It is the principal object of the present invention to provide control means to regulate the flow of heated air from the heating conduits of a vehicle of the type referred to above and particularly to control the discharge of air through the lower discharge means adjacent the floor of the vehicle, particularly by providing shield means which may be utilized to either completely or partially cover the outlet opening in the conduit means adjacent the floor of the vehicle, whereby either the major portion or all of the heated air, as desired, selectively may be discharged through the windshield defrosting discharge means of the heating conduit.

Another object of the invention is to provide an extremely simple and relatively inexpensive shield member which is of substantially the same size and shape as the outer surface of the grilled outlet opening in the heating conduit adjacent the floor of the vehicle, and magnet means are provided upon the shield member for purposes of being detachably and magnetically connected to the ferrous metal grill which extends over the outlet opening in the heating conduit and thereby detachably connect the shield member either completely or partially in covering relationship over said outlet opening so as to control the discharge of heat therethrough.

A further object of the invention is to form the shield member preferably from sheet metal material, such as aluminum, capable of being die-stamped not only to impart the desired shape to the shield member but also to form a cup-shaped recess therein having a smaller area than that of the shield member and projecting away from the surface of the shield member which engages the grill covering the outlet opening, said recess accommodating a magnet so that the outer surface thereof is flush with said surface of the shield member.

Still another object of the invention is to utilize the cup-shaped recess means which projects from the opposite surface of the shield member as stop means to limit the slidable movement of one end or the other of the shield member beneath covering or finishing material on the interior of the body which surrounds the outlet opening in the heating conduit.

A still further object of the invention is to secure the magnet within the cup-shaped recess of the shield member by a screw having a head recessed into the outermost surface of the magnet and threaded into a handle member affixed to the outer surface of the cup-shaped recess portion of the shield member, whereby simple and inexpensive uniting means are afforded for the entire assembly comprising the control means.

Details of the foregoing objects and of the invention are set forth in the following specification and illustrated in the drawing comprising a part thereof.

In the drawing:

FIG. 1 is a fragmentary, exploded view showing portions of the floor of a vehicle and fragmentary portions of an exemplary heating conduit having an outlet opening therein adjacent the floor of the vehicle and also a fragmentary portion of one corner of the windshield of said vehicle adjacent which another outlet opening from said heating conduit is provided to effect defrosting of the windshield.

FIG. 2 is an enlarged elevation of the outlet opening in the conduit means shown in FIG. 1 adjacent the floor of a vehicle, said outlet opening being covered by a shield member comprising control means for the discharge of heated air and the fiinishing material surrounding the outlet opening being only fragmentarily illustrated.

FIG. 3 is a view similar to FIG. 2 but showing the shield member comprising the control means partially slid away from one end of the outlet opening so as to expose a part of the grill opening for discharge of heated air therethrough, while covering the remainder of the grill openings.

FIG. 4 is a fragmentary, exemplary sectional view taken on the line 4—4 of FIG. 2, portions of certain components of the control means being broken away to illustrate the details of construction thereof.

Referring to FIG. 1, only a fragmentary portion of the interior of the body of a motor vehicle is illustrated, the same principally being represented by a floor 10 and a part of the side wall 12 adjacent the floor. Also, a portion of the lower outside corner of the windshield 14 is shown in the upper lefthand corner of the figure. Extending along the side wall 12 adjacent the floor 10, but rearwardly of the interior surface of the side wall, is a heating conduit 16 which extends, for example, from a source of heat such as any one of a number of popular heat exchange means used with motor vehicles.

Within one wall of the heating conduit 16, outlet opening means 18 are provided so as to be adjacent the floor 10 of the vehicle and thereby discharge heat conveniently adjacent the feet of the driver or passenger of the vehicle, it being understood that there is a conduit 16 respectively adjacent opposite sides of the vehicle. The outlet opening means 18 preferably is in the form of a grill comprising a series of openings 20 which, preferably, is formed directly in one wall of ferrous conduit 16 by stamping and bending flanges 21 therefrom. The opposite end 22 of the conduit 16 from that which is connected to the source of heat communicates with an outlet member 24 which is disposed adjacent the lower outside corner of the windshield 14 adjacent opposite sides of the vehicle for purposes of discharging heated air against the windshield to defrost the same. When not serving for defrosting purposes, the heated air discharged against the windshield also is dispersed within the interior of the vehicle so as to cooperate with the outlet opening means 18 in heating the entire interior of the vehicle. In normal construction of this type of heating means, only a single control valve or mechanism, not shown, is placed within the conduit 16 between the outlet opening means 18 and the source of heat to which the conduit 16 is connected, whereby when such control valve is open, for example, heated air is discharged simultaneously through both the outlet opening means 18 and the outlet member 24.

Under conditions where it is desired to consume either all or the majority of the heated air for defrosting purposes adjacent the windshield 14, it normally is not possible to regulate the discharge of heated air through the outlet opening means 18 so as to permit such added defrosting capacity relative to the windshield.

In accordance with the principles of the present invention, a preferably rigid cover or shield member 26 is provided for purposes of either completely or partially covering the outlet opening means 18 and especially one or more of the openings 20 thereof. For this purpose, the shield member 26 is substantially complementary in both size and shape to the outlet opening means 18. In its preferred construction, the shield member 26 is formed from non-metallic material such as synthetic resin, aluminum, brass or bronze, and the like, all of which preferably are in sheet form and capable of being die-pressed or stamped to facilitate fabrication of the same.

The preferred exemplary shape of the shield member 26, in plan view, is as shown in FIGS. 2 and 3, whereas the preferred exemplary shape thereof in cross-sectional view is as shown in FIG. 4. From FIG. 2, it will be seen that member 26 slightly overlaps the margins of opening means 18 in normal use of said member. Referring to FIG. 4, it will be seen that one surface 28 of the shield member is provided with a cup-like recess 30, which extends away from the surface 28 and is defined by side walls 32. Thus, the opposite surface 34 of the shield member is provided with a projection 36 which, preferably, is either square or rectangular in shape and the side walls 32 are all preferably spaced from the edges of the shield member 26.

The cup-like recess member 30 within the projection 36 accommodates a preferably high-powered magnet 38 which is substantially complementary to the recess 30 and the outer surface 40 of the magnet is substantially flush with the said one surface 28 of the shield member 26.

The magnet 38 may be secured by any suitable means to the interior of recess 30 but, in accordance with the preferred construction of the invention, the magnet 38 is provided with a substantially central and chamfered opening which is complementary to and receives the headed end of a screw 42 as clearly shown in FIG. 4. Said screw is sufficiently long to extend through a coaxial hole formed within the outer wall of projection 36, whereby a handle 44 may be threaded upon the screw 42 so as simultaneously to provide a simple and inexpensive, as well as convenient assembly means for connecting all elements of the control means for the heating opening means 18 which control means comprises the shield member 26, magnet 38, and handle 44.

The constuction of the vehicle is such that the side wall 12 thereof normally is covered by a layer or sheet of finishing material 46, the same having an opening therein coextensive with and surrounding the outlet opening means 18 so as to not interfere with the discharge of heated air through openings 20. Preferably, suitable flexible beading 48 surrounds the opening in the finishing material 46, whereby a durable edge is provided for the opening in the finishing material. For example, said beading may be formed from rubber-like material which is molded directly to the finishing material.

Preferably, the finishing material 46 is not rigidly secured to the backing member therefor which comprises part of the side wall 12, whereby it is possible as an alternate manner of mounting the shield relative to opening means 18, to insert the marginal edges of shield 26 beneath the peripheral edges of flexible molding 48 adjacent opening means 18, thus making it possible to slidably move, for example, one end of the shield member 26 beneath the entire width of the beading 48 at one side of the opening in the finishing material 46, in the exemplary manner illustrated in FIG. 3 for example, wherein it will be seen that at least one of the grill openings 20 has been uncovered by the shield member 26 and the extent of uncovering of the grill by the shield member is limited only by the engagement of one of the side walls 32 of the projection 36 with a portion of the beading 48 on the finishing material 46, as shown in FIG. 3. Thus, the projection 36 serves as stop means for controlling the extent of partial discharge through the grill openings 20 of the outlet opening means 18. Further, the projection of one end of the shield member 26 beneath the finishing material 46 cooperates with the magnet 38 in maintaining the shield member 26 in operative position over the outlet opening means 18 of the heating means. To remove the shield entirely from over opening means 18, it is only necessary to flex molding 48 sufficiently to remove the shield from beneath it.

From the foregoing, it will be seen therefore that the control means for regulating the flow of heated air from the outlet opening means 18 which is in one wall of the heating conduit 16 may be operated either to shut off completely the discharge of heated air through the outlet opening means 18 or permit a limited amount of discharge of heated air therethrough, selectively, as desired, in accordance with the requirements for the heated air to defrost the windshield 14. Further, the magnet 38 serves very conveniently to maintain the control means comprising shield member 26 and its connected elements to any convenient ferrous storage surface on the interior of the vehicle, such as beneath the glove compartment of the dash panel, especially when normal discharge of heated air through the outlet opening means 18 is to take place.

While the invention has been described and illustrated in its several preferred embodiments, it should be understood that the invention is not to be limited to the precise details herein illustrated and described since the same may be carried out in other ways falling within the scope of the invention as claimed.

We claim:

1. Control means to regulate the flow of heated air from outlet means of a vehicle heating conduit provided with a ferrous grill mounted in one wall thereof, said control means comprising an integral shield member formed from sheet material and complementary in shape and size to an outlet opening means in a vehicle heating conduit of the type referred to and operable to cover the same to prevent appreciable discharge of heat therefrom when desired, said shield member having a cup-shaped recess formed therein by pressing said sheet material to displace a portion of it from the plane of said member, a permanent magnet mounted within said recess and flush with the surface of said member from which said recess extends, and means to secure said magnet fixedly within said recess to permit said shield member to be held by magnetic attraction adjustably to a grill of a heating outlet of the aforementioned type to cover a desired portion of such outlet opening and thereby regulate discharge of heat therethrough.

2. The control means according to claim 1 in which said securing means for said magnet comprises a bolt extending through said magnet from the outer surface thereof and through the bottom of the recess in said shield member, and a handle member threadably connected to said bolt to tighten the same against said magnet and thereby secure said magnet within said recess and provide means to readily manipulate said shield member manually.

3. The control means according to claim 1 in which said recess is defined by side walls projecting transversely from the outer surface of said shield member when applied to a heating outlet opening to cover the same adjustably, said walls being spaced at least from the opposite ends of said shield member and said recess being shorter than the length of said member, whereby said shield member may be disposed with its edges beneath flexible beading surrounding and partially overlying the perimeter of a heating outlet opening and said shield member also being slidable at one end beneath such beading to permit adjustable covering of a heating outlet opening and the exterior of said walls of said cavity serving as stop means to restrict slidable movement of said shield member relative to a heating outlet opening by contacting the beading surrounding such opening.

References Cited by the Examiner

UNITED STATES PATENTS

| | | | |
|---|---|---|---|
| 493,321 | 3/93 | Weis. | |
| 1,274,996 | 8/18 | Davis | 98—101 |
| 2,102,681 | 12/37 | Curtis | 98—114 |
| 2,147,482 | 2/39 | Butler. | |
| 2,717,096 | 9/55 | Henderson | 248—206 X |
| 2,727,650 | 12/55 | Moyniham | 317—159 |
| 2,761,717 | 9/56 | Mahlke | 220—55 |
| 2,771,904 | 11/56 | Sherman et al. | 251—145 X |
| 2,772,804 | 12/56 | Byrnes | 220—24 |
| 2,904,364 | 9/59 | Korodi | 317—159 X |
| 2,947,507 | 8/60 | Schlage et al. | 248—206 |
| 2,963,629 | 12/60 | Rhodes | 317—159 |

ROBERT A. O'LEARY, *Primary Examiner.*

CHARLES O'CONNELL, *Examiner.*